Dec. 30, 1924.  
G. P. MILLER  
1,521,117  
AXOMETER  
Filed Oct. 30, 1922  3 Sheets-Sheet 1
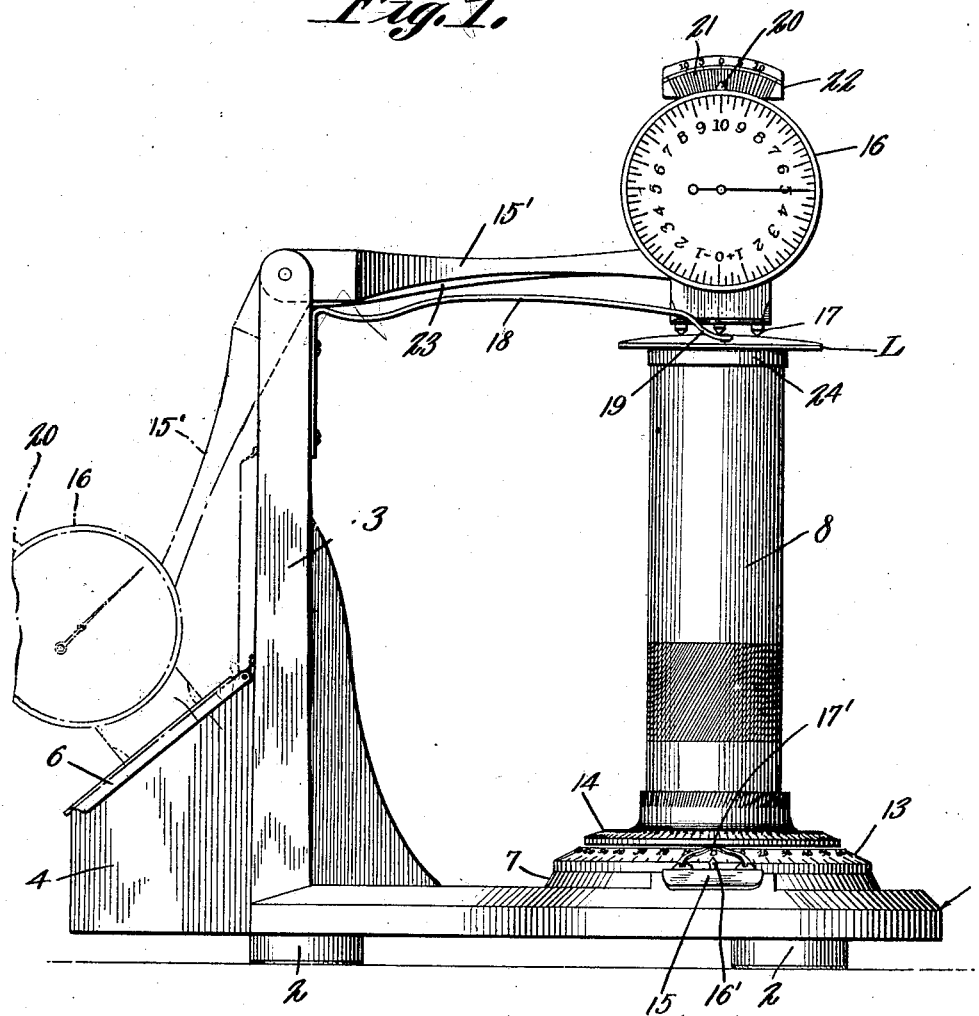

Dec. 30, 1924.
G. P. MILLER
AXOMETER
Filed Oct. 30, 1922
1,521,117
3 Sheets-Sheet 2
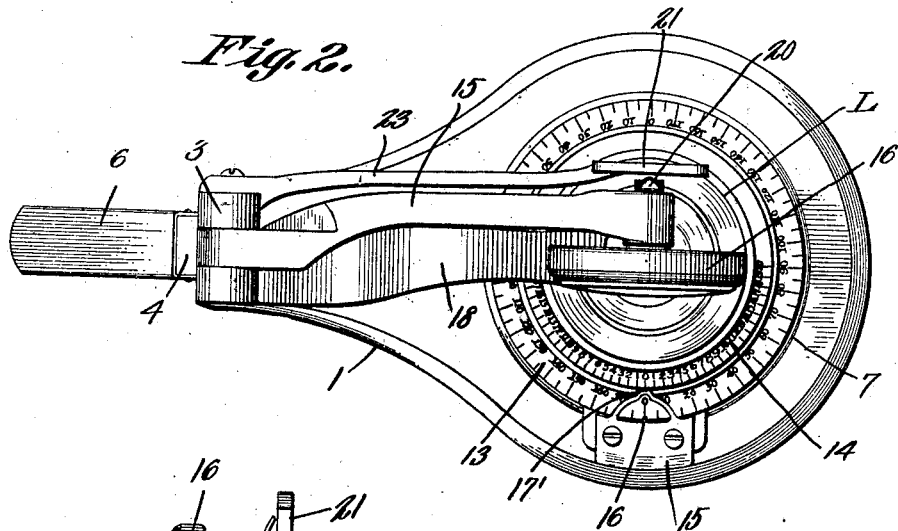
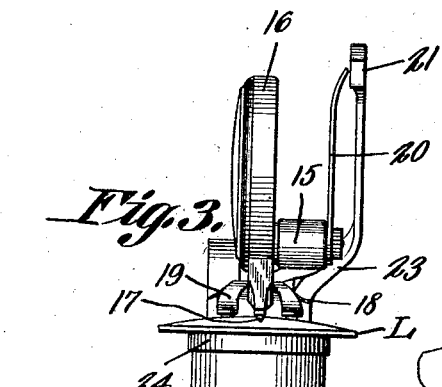
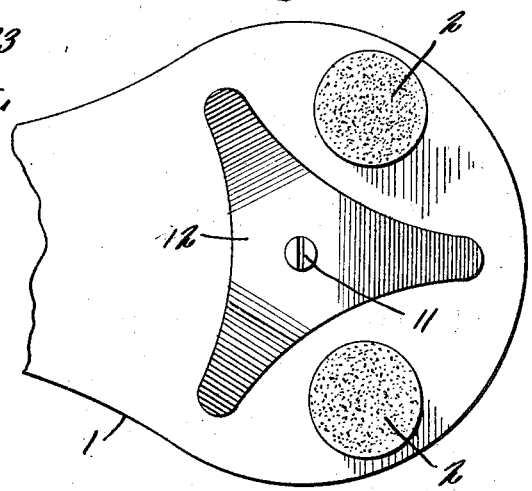
G. P. Miller,
Inventor
By C. A. Snow & Co.
Attorneys Dec. 30, 1924.  
G. P. MILLER  
AXOMETER  
Filed Oct. 30, 1922  
1,521,117  
3 Sheets-Sheet 3
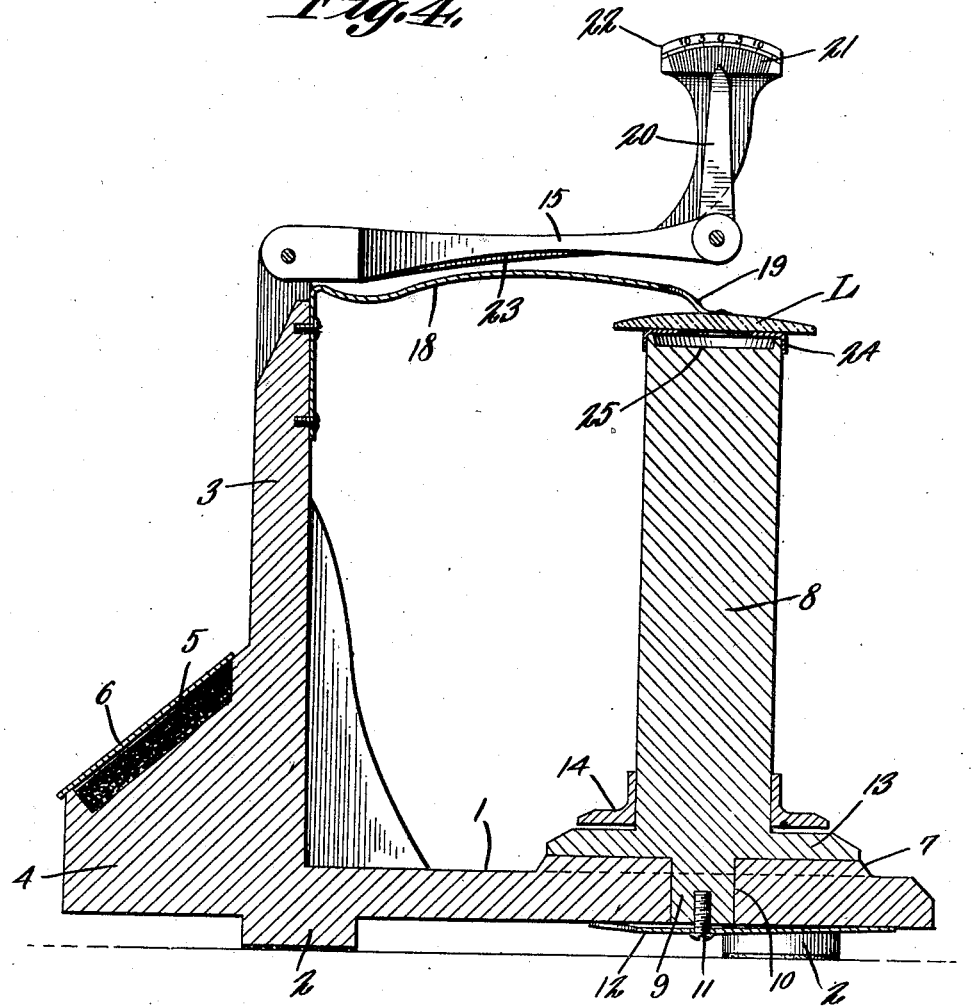

Patented Dec. 30, 1924.

1,521,117

UNITED STATES PATENT OFFICE.

GEORGE PERLEY MILLER, OF DOVER-FOXCROFT, MAINE.

AXOMETER.

Application filed October 30, 1922. Serial No. 597,888.

*To all whom it may concern:*

Be it known that I, GEORGE P. MILLER, a citizen of the United States, residing at Dover-Foxcroft, in the county of Piscataquis and State of Maine, have invented a new and useful Axometer, of which the following is a specification.

This invention relates to an optical instrument known as an axometer, one of the objects of the invention being to provide a simple and compact device of this character having means for holding a lens and a lens measure in proper relation to each other. It is, of course, understood that a cylindrical lens is a lens of varying curvature which consequently varies in strength and has two principal meridians located at right angles to each other. One of these is of greatest curvature and the other is of least curvature. The weakest meridian, or meridian of no strength, is commonly known as the axis. An object of this invention is to provide a means for holding in accurate position and rotating such a lens while cooperating with the lens measure, the lens to be rotated to the right until a certain reading on the lens measure is obtained and then rotated to the left until the same reading is obtained. The difference of the rotation of the lens is then determined on a scale provided therefor and this difference is divided by two and the instrument set accordingly, thereby indicating the exact axis of the cylinder.

A further object is to provide means for determining the optical center and means for dotting the axis and optical center.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a front elevation of the axometer, the lens measure being shown, by dotted lines, in position on the inking pad of the device.

Figure 2 is a plan view of the axometer.

Figure 3 is an end elevation.

Figure 4 is a vertical longitudinal section through the device.

Figure 5 is a bottom plan view of a portion of the axometer.

Referring to the figures by characters of reference 1 designates a base having means, such as pads 2 for engagement with a table or other supporting structure. This base is provided at one end with a standard 3 and projecting outwardly from the lower portion of the standard is a holder 4 containing an inking pad 5 normally covered by a hinged lid 6.

The base 1 is formed with a circular raised portion 7 the periphery of which is beveled as shown.

A post 8 is mounted for rotation above the base and has a bearing stud 9 projecting downwardly therefrom and rotatable within an opening 10 in the base. A stud 11 such as a screw, is extended from the center of the stud 9 and is rotatable within and engages a spring plate 12 pressing against the bottom of the base 1. The post 8 has an annular flange 13 contacting with the raised portion 7 and the periphery of this flange is beveled and provided with opposed series of graduations, the graduations of each series extending through one-half a circle and being designated by numerals ranging from zero upwardly to indicate degrees. The zero graduations are diametrically opposed as will be seen by referring particularly to Figure 2.

A ring 14 is mounted for rotation on the post 8 and bears on the flange 13, this ring being formed with a beveled periphery on which are indicated graduations arranged in series extending in opposite directions from a central or zero graduation. Each series of graduations on this ring extends through one-quarter a circle and the graduations are numbered from "1" to "20" as shown in Figure 2.

Secured to the base 1 is a bevel indicator 15 one point 16' of which is adapted to indicate the graduations on the disk 13 and the other point 17' is adapted to indicate a graduation on the ring 14.

An arm 15' is hingedly connected at one end to the top of the standard 3 and pivotally connected to the other end of this arm is a lens measure 16 of the usual construction provided with lens engaging points 17 as ordinarily. A holding spring 18 is secured to the standard 3 and has a forked end 19 adapted to rest on a lens supported by the post 8. The lens measure has a finger 20 projecting upwardly at the back thereof and adapted to indicate any one of the series of graduations 21 carried by a segment 22 which, in turn, is supported back of the arm 15 by an arm 23.

A ring 24 is arranged on the top of the post 8 and overhangs a recess 25 formed in the post. This ring is adapted to support a lens L. The lens is arranged with its convex side up and with what is known in the trade as the "cutting" or "180 line" placed over suitable indicating dots arranged on the ring, so that said line will be exactly parallel with the graduations marked "0" on the flange 13. This "180 line" on the protractometer indicates the horizontal meridian of the lens, or if the lens is already in the frame of eyeglasses, the nose piece and outside stud of the frame can be used to indicate the line. The horizontal meridian of the lens is known as the cutting line or the horizontal axis of a lens as mounted in a frame, regardless of where the axis of the cylinder may fall. The lens is of course held firmly on the ring 24 by the spring finger 19. The post 8 is now turned until the hand on the lens measure 16 indicates the weakest meridian of the lens, or in other words, the axis or weakest meridian of the lens is actually determined by the lens measure before starting to locate the axis, as is commonly done when the lens measure commonly used is held in the hand. The rotation of the post is continued in the same direction until the hand of the lens measure begins to register increased strength. The rotation of post 8 is then stopped and the ring 14 is rotated until it registers "0" at the indicating point 17'. The post 8 is now rotated in the opposite direction until the weakest meridian of the lens is again indicated by the lens measure and the rotation of the post is continued until the lens measure again registers the same amount of increased strength as it did in the former instance. The rotation of the post is then stopped and the user notes the number of the graduation on scale 14 indicated by the point 17'. This is divided by two and the post is then turned until the graduation obtained by the division is designated by the pointer 17. The axis of the lens can now be read from the scale on flange 13 by pointer 16'. If it should be desired to dot the lens, the lens measure can be swung backwardly and downwardly and turned so as to bring the points 17 into contact with the ink pad 5 as shown by dotted lines in Figure 1. By then returning the lens measure to its normal position the points will mark the lens.

The instrument described also provides means of determining the optical center or any prismatic value which may be present in a lens. It is, of course, understood that the decenteration of a lens immediately creates some amount of prismatic action. The exact degree of the same depends on the given curvatures of the lens which, (as in the case of any prism) shows itself in the edge thickness of the lens. When a lens is thicker one one side than the other a rocking motion of the lens measure (which is produced by the points of the lens measure resting on the lens) will be registered by the hand 20 on scale 21. This, of course, deals with only one meridian of a lens at a time and the lens must be revolved to right angles to obtain the reading of the opposite meridian.

It is to be understood that the graduations on the scale 14 cooperate with the pointer 17' as a means for indicating and dividing the difference between two points of increased strength. When the points are thus divided it will indicate the axis of weakest meridian of the cylinder. It is understood of course that the lens measure registers the points of increased strength while the graduations 14 furnish the means by which the central position between these two points can be accurately determined.

What is claimed is:—

1. In an axometer the combination with a base, of a lens supporting post mounted for rotation on the base and having series of graduations extending through 180° therearound, a ring mounted for rotation on the post and having opposed series of graduations each extending through one-quarter of a circle from a zero graduation, said graduations being numbered in each series from "0" to "20", superposed pointers cooperating with the graduations on the post and ring, a lens measure and means for movably supporting said lens measure from said base for contact with the lens on the post.

2. An axometer including a post mounted for rotation, said post having series of graduations, the graduations of each series extending through 180°, a ring mounted for rotation on the post and having oppositely extending series of graduations, the graduations of each series extending through one-quarter of a circle from a zero graduation and being numbered from "0" to "20", said post constituting a lens support, yielding means for holding a supported lens upon the post to rotate therewith, a lens measure supported above the post and means for movably supporting said lens measure relative to the post for engagement with the lens during the rotation of the lens with the post.

3. An axometer including a post mounted for rotation, said post having series of graduations, the graduations of each series extending through 180°, a ring mounted for rotation on the post and having oppositely extending series of graduations, the graduations of each series extending through one-quarter of a circle from a zero graduation and being numbered from "0" to "20", said post constituting a lens support, yielding means for holding a supported lens upon the post to rotate therewith, a lens measure, means for movably supporting the lens measure above the post to engage the lens during the rotation of the lens with the post, and means for indicating the tilt of the lens measure relative to the post.

4. In an axometer a post mounted for rotation and having graduations extending through 180°, a ring mounted for rotation on the post and having oppositely extending series of graduations, the graduations of each series extending through one-quarter of a circle and being consecutively numbered from "0" upward, indicators cooperating with the graduations on the post and ring respectively, yielding means for holding a lens upon the post to rotate therewith, a lens measure, and means for movably supporting the lens measure above the post for contact with the lens.

5. In an axometer a post mounted for rotation and having graduations extending through 180°, a ring mounted for rotation on the post and having oppositely extending series of graduations, the graduations of each series extending through one-quarter of a circle and being consecutively numbered from "0" upward, indicators cooperating with the graduations on the post and ring respectively, yielding means for holding a lens upon the post to rotate therewith, a lens measure, means for movably supporting the lens measure above the post for contact with the lens, an inking pad, said lens measure being shiftable relative to the post to position its points in contact with the pad.

6. In an axometer a post mounted for rotation and having graduations extending through 180°, a ring mounted for rotation on the post and having oppositely extending series of graduations, the graduations of each series extending through one-quarter of a circle and being consecutively numbered from "0" upward, indicators cooperating with the graduations on the post and ring respectively, yielding means for holding a lens upon the post to rotate therewith, a lens measure means for movably supporting the lens measure above the post for contact with the lens, and means for indicating the tilt of the lens measure relative to the post.

7. In an axometer the combination with means for determining two opposed points of equal strength on a cylindrical lens, of means for determining the central position between said points, thereby to locate the axis.

In testimony that I claim the foregoing as my own, I have hereto affixed my signature in the presence of two witnesses.

GEORGE PERLEY MILLER.

Witnesses:
  HAROLD M. HAYES,
  LOTA B. HAYES.